(12) United States Patent
Behrens et al.

(10) Patent No.: US 8,863,011 B2
(45) Date of Patent: Oct. 14, 2014

(54) SYSTEM AND METHOD FOR HANDLING ARBITRARY TYPES OF SOFTWARE OBJECTS

(75) Inventors: Christian Behrens, Wiesloch (DE); Steffen Rotsch, Rauenberg (DE); Martin Scholz, Nußloch (DE)

(73) Assignee: SAP SE, Walldorf (DE)

( * ) Notice: Subject to any disclaimer, the term of this patent is extended or adjusted under 35 U.S.C. 154(b) by 1616 days.

(21) Appl. No.: 11/967,204

(22) Filed: Dec. 30, 2007

(65) Prior Publication Data

US 2009/0172572 A1    Jul. 2, 2009

(51) Int. Cl.
G06F 3/048 (2013.01)
G06F 9/44 (2006.01)
G06F 3/01 (2006.01)

(52) U.S. Cl.
CPC .. *G06F 8/24* (2013.01); *G06F 8/30* (2013.01); *G06F 8/20* (2013.01); *G06F 3/01* (2013.01)
USPC .......................................... 715/762; 715/763

(58) Field of Classification Search
USPC ................................................ 715/762, 763
See application file for complete search history.

(56) References Cited

U.S. PATENT DOCUMENTS

| 2002/0120859 | A1* | 8/2002 | Lipkin et al. ................... 713/200 |
| 2004/0001092 | A1* | 1/2004 | Rothwein et al. ............ 345/763 |
| 2005/0125716 | A1* | 6/2005 | Cragun et al. ................. 715/512 |
| 2005/0197852 | A1* | 9/2005 | Gebhard et al. ................... 705/1 |

\* cited by examiner

*Primary Examiner* — William Bashore
*Assistant Examiner* — Gregory A Distefano
(74) *Attorney, Agent, or Firm* — Kenyon & Kenyon LLP

(57) ABSTRACT

A system and method are provided for handling different types of objects within a software framework. In an embodiment, an object handler keeps track of information associated with objects, and information needed to implement a user interface. The software framework employing the object handler uses that information to create the user interface so as to get user input/action. A user may select an object type and enter an associated one or more identifiers via the user interface. In response to the entering of the information, a method call of the object handler is made to determine whether the object associated with the object type and identifiers exists, and depending upon that determination, an action or further method call may be initiated and/or requested.

7 Claims, 7 Drawing Sheets

| Object type 202 | Object handler class 204 |
|---|---|
| PROCESS | CL_PROCESS_HANDLER |
| FORM_SCENARIO | CL_FORM_SCENARIO_HANDLER |
| ... | CL_... |

FIG. 2

| User action 602 | Method call 604 |
|---|---|
| | Create UI based on information provided by method GET_INFO 606 |
| Selects object type "Process" and enters "HIRE_01" and presses DISPLAY button 608 | |
| | Calls method CHECK_OBJECT_EXISTS to check, if object exists (assume YES -> TRUE) 610 |
| | Calls method CHECK_AUTHORIZATION to check, if user is authorized (if no -> show message "You are not authorized" and stop) 612 |
| | Calls method GET_TASK_REQUEST_FOR_DISPLAY and then calls the object specific component that has registered on this task 614 |
| Selects object type "Process" and enters "HIRE_NEW" and presses DISPLAY button 616 | |
| | Calls method CHECK_OBJECT_EXISTS to check, if object exists (assume NO -> FALSE) 618 |
| | We will offer the user the possibility to create the object; first check, if user is authorized to create the object by calling method CHECK_AUTHORIZATION (if no -> show message "object does not exist; no authorization to create the object" and stop) 620 |
| | Show popup with text "object does not exist; do you want to create it?"; show buttons YES and NO 622 |
| User presses button YES 624 | |
| | CALL method CREATE_OBJECT; the object handler will create the object; if the object handler wants to trigger any follow-up action, he will return (in addition) a task-request which will result in calling the object specific component that has registered on this task 626 |

FIG. 6

| User action 702 | Method call 704 |
|---|---|
| User enters "H*" and presses button "SHOW_LIST" 706 | |
| | Detects, that user entered a placeholder (*) in the input field 708 |
| | Calls method GET_EXISTING_OBJECTS by passing "H*" as importing parameter; (if user would not have used a placeholder, nothing is passed as importing -> method has to return a complete list of existing objects in this case) 710 |
| | List of existing objects (all starting with letter "H") are shown in a popup 712 |
| User selects one of the objects in the list 714 | |
| | Continues the same way as if the user has pressed button DISPLAY for the selected object 716 |

FIG. 7

| User action 802 | Method call 804 |
|---|---|
| User enters something in the input field and presses ENTER (key) 806 | |
| | Checks, if the input done by the user contains any placeholder (? Or *). If no: behaves the same way as if the user has pressed button DISPLAY<br>If yes: behaves the same way as if the user has pressed button SHOW_LIST -> dynamic behavior based on user input 808 |
| | |
| Selects object type "Process" and enters "HIRE_01" and presses DELETE button 810 | |
| | Calls method CHECK_OBJECT_EXISTS to check, if object exists (if no -> show message "does not exist" and stop) 812 |
| | Calls method CHECK_AUTHORIZATION to check, if user is authorized to delete object (if no -> show message "You are not authorized to delete…" and stop) 814 |
| | Show popup with text "are you sure to delete the object?"; show buttons YES and NO 816 |
| | If YES -> Calls method DELETE_OBJECT to delete the object 818 |

FIG. 8

SYSTEM AND METHOD FOR HANDLING ARBITRARY TYPES OF SOFTWARE OBJECTS

BACKGROUND

Businesses rely on software applications which handle various functions, including managing resources such as employees, assets, and the like. In order to implement such software applications, a user must set up the software application within the existing system of the business. Situations may arise which impede such setups, including incompatible programs. In such situations, a person needs to modify at least one application in order to facilitate the proper implementation of the new software application. Such modifications typically are executed during design time.

In any given software application, however, various types of objects may be involved. Such types of objects may need to be handled by a user in order to facilitate the setup processes of the software application.

Accordingly, there exists a need for a design time application that allows a user to handle the process objects, including related objects involving handling user data, authorizations, environment set ups, and other matters.

BRIEF DESCRIPTION OF THE DRAWINGS

FIG. 2 shows an example table for assigning object handler classes to object types according to an example embodiment.

FIG. 6 shows example user actions and method calls according to example embodiments.

FIG. 7 shows example user actions and method calls according to an example embodiment.

FIG. 8 shows example user actions and method calls according to an example embodiment.

DETAILED DESCRIPTION

Figure 1:
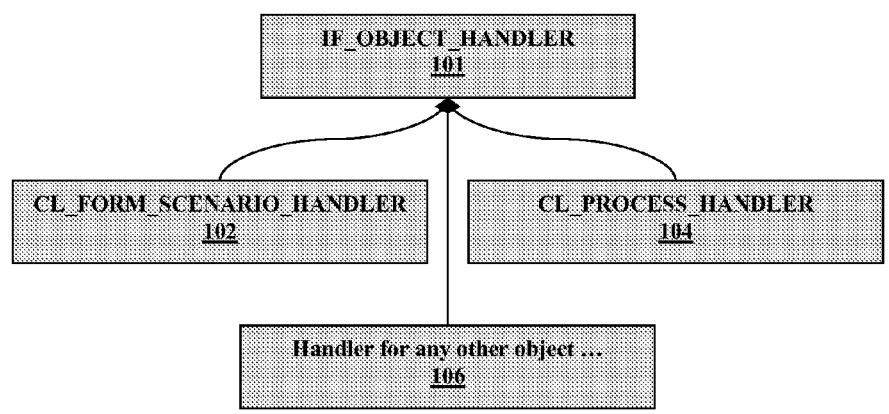
FIG. 1 shows an example object handler interface according to an example embodiment.

Embodiments of the present invention provide a design time application that allows a user to easily setup processes. Oftentimes, when setting up processes, a lot of different objects are involved. Besides the object PROCESS, there are several related objects that handle user data, authorizations, environment setups, and other tasks. And, additional objects may be added to the processes in the future. Accordingly, embodiments of the present invention provide a generic approach which enables new objects added to a process without needing to modify and adapt the design time application.

Embodiments of the present invention provide for a user interface which visualizes all types of objects. Further, the user interface is in control of the design time, and not within the control of the object itself. This embodiment allows for centrally changing the visualization of all objects without the need to touch the individual objects.

Embodiments of the present invention provide for a system, method, and computer-readable medium including instructions executable to implement a user interface of a design time application. The visualization of the objects are not hard coded. In a further embodiment, an object handler is provided. For each object type, an object specific class is created implementing a predefined interface. The interface methods provide all the necessary information to visualize and to handle an object.

In an embodiment of the present invention, a flexible engine is provided in which a user can implement processes without hard coding, e.g., ABAP coding. For example, a process is defined in various IMG activities and is stored in different customizing tables (one or several tables). A user may define its processes consistently via an embodiment of the present invention in which one transaction is provided which maintains all necessary tables and customizing entities. A framework termed herein as Design Time is developed in accordance with an embodiment of the present invention.

In an embodiment of the present invention, at least one PROCESS object and/or FORM SCENARIO object is provided. These object(s) and/or other entities provide functionality to setup, for example, a human resources related processes. For example, processes contain all the information needed for the process flow and the people involved. Form scenarios provide the definition of the data to be changed as well as the design of the user interface (e.g., forms for the data entry). Besides these two main objects, there may be other objects involved such as, for example, AUTHORIZATION GROUPS that define general authorization settings, or PROCESS GROUPS.

In an embodiment of the present invention, the design time framework is extensible so that other object(s) having similar or different object types are addable at a later time. Accordingly, the design time framework embodiment is highly flexible. For example, a user may "plug in" its own object(s) into the design time framework embodiment of the present invention. In an embodiment of the present invention, to provide a highly flexible design time framework, an object handler is provided which is capable of handling arbitrary objects.

An embodiment of the present invention includes an object handler for handling arbitrary types of objects. The object handler embodiments described herein may be used within the described embodiments of the design time framework or other framework(s).

An embodiment of the present invention includes an object handler which does not have a user interface. The object handler instead only provides all the information needed to create a user interface. Accordingly, the framework, e.g., the design time framework, that uses the object handler obtains the information provided by that object handler to create a user interface. An example embodiment of how the information is used by the framework to create a user interface is described below.

In an embodiment of the present invention, the design time framework has nearly no static knowledge about the objects it handles. In fact, all the required information is retrieved at runtime at the moment when the information is needed from the object handler. As a result, an example embodiment of the object handler includes the following tasks:

Provides technical information about the ID that identifies the object, e.g., data type of identifier (ID), and/or length of the ID, etc.
Creates a new object
Creates a list of existing objects
Checks existence of a single object
Deletes an existing object
Checks if a user is authorized to perform any action with the object In FIG. 1, an example object handler interface is shown in which class(es) are implemented per type of object. For example, to have a unified way for accessing the object handlers, an interface (IF_OBJECT_HANDLER 101) is provided which every object handler (e.g., Handler for any other object 106) must implement. FIG. 1 shows, for example, that for each type of object a dedicated class (CL_FORM_SCENARIO_HANDLER 102, CL_PROCESS_HANDLER 104) has to implement interface IF_OBJECT_HANDLER 101 and, thus, provide the functionality needed to generically handle objects of this respective type. In this example, the framework, e.g., the design time framework, only communicates with the object handler via the interface.

In a further embodiment, to know which class represents which object type, a table is created and maintained. FIG. 2 shows an example table containing the relationship information between the class(es) and the object type(s). That is, the table in FIG. 2 contains the assignments of the object handler class(es) 204 with the respective object type(s) 202. In FIG. 2, example object type PROCESS is shown associated with or assigned with the example object handler class CL_PROCESS_HANDLER. And, example object hander class CL_FORM_SCENARIOU_HANDLER is shown associated with or assigned to the example object type FORM_SCENARIO. Other object types and object handler classes besides those shown here for example purposes may be used. In a further embodiment, a table such as that shown in FIG. 2 contains the only static information that is available about the objects.

In an embodiment of the present invention, each object handler handles all objects of a certain type. For example, the object handler for processes, e.g., CL_PROCESS_HANDLER, handles processes. In this example, an individual process is represented by an ID, e.g., an ID having a character string of a certain length. Here, for example, the ID may have a character string length of 30. For example, the object handler for organization units, e.g., CL_ORGUNIT_HANDLER, handles organizational units. In an example embodiment, relations between organizational units construct an organizational structure. Organizational units may be represented by a pair consisting of a so called "plan variant" which has, e.g., two characters and a number which consists of, e.g., 8 digits. Both together (the plan variant and the number) can be used as the identification or ID of an organizational unit.

For example, plan variants are used to separate organizational units into different "areas." For example, plan variant "01" may contain the current and active organizational units whereas plan variant "02" may contain the planning of organizational units which might become active at some time in the future.

In embodiments of the present invention, different object types may have completely different representations with respect to type, length and number of components. This is what is referred to here as the "object key." As the framework has to visualize the object (e.g., display a user interface where the user can enter the ID of the object), the framework needs to be aware about the structure of the object key. In an embodiment of the present invention, when communicating with the object handler, e.g., via the interface, and passing the object key, this awareness is effected in a generic way. For example, any object—whatever its structure—is encapsulated in a generic object key entity and passed around.

In an embodiment of the present invention, user interface related tasks are delegated to specific tools, or user interface tools. As described above, the object handler does not implement any user interface related tasks. However, in some situations, there may be a need to present a user interface to a user. For example, if a new object is to be created, the framework, e.g., the design time framework, provides a user interface so that a user or other may enter the ID of the object to be newly created. After the user or other enters the ID, the framework, e.g., the design time framework, calls an object handler method to actually create the object and persist it on the database. However, in this example, only entering the ID might not be sufficient to create the object.

Typically, there are additional properties associated with an object that need to be maintained. To accomplish this, an additional user interface is needed. If a user interface, e.g., the additional user interface here, is not within the scope of the framework, e.g., design time framework, or within the scope of the object handler, then the following example approach may be utilized. That is, whenever the object handler has the wish to trigger any additional follow up activity (e.g., present a user interface for entering further information), the object handler returns a so-called "Task-Request" or the like to the framework. This "Task-Request" is an abstract description of an additional task that needs to be performed. In an embodiment of the present invention, the "Task-Request" includes such information as: 1) the "object key" of the object in focus, and 2) an identifier representing the "task" to be performed for the object.

The framework, e.g., the design time framework, provides the means for object specific components to register on these "tasks". For example, as soon as the framework receives a "Task-Request," the framework delegates the "Task-Request" to the corresponding object specific component. This object specific component handles and/or takes over further related tasks, e.g., further user interface related tasks.

In an embodiment of the present invention, each object handler needs to implement the following methods of interface IF_OBJECT_HANDLER. For example, the object handler needs to provide information about the object (e.g., GET_INFO), including, for example, the number of components the object key consists of; the type of each component of the object key (e.g., character(s) or numeric representations); the length of each component of the object key; and descriptive text for each component of the object key (e.g., "Process" or "Plan variant" or "Object ID"). For example, the object handler needs to create a new object (CREATE_OBJECT). The new object is to be identified by an object key being passed as importing parameter by the framework (i.e., the object key was entered earlier by the user). For example, the object handler needs to return a list of all objects that currently exist (GET_EXISTING_OBJECTS). Importing parameter might optionally be a pattern that restricts the list of objects. For example, the pattern "H*" restricts the list of objects to be returned by the object handler to those processes whose name starts with "H" (e.g., "HIRE", "HEALTH_CARE," etc.). For example, the object handler has to check if the object with the key being passed as importing parameter already exists (CHECK_OBJECT_EXISTS). Then, depending upon the findings, it either returns TRUE or FALSE. For example, the object handler has to delete the object with the key being passed as importing parameter (DELETE_OBJECT). For example, the object handler has to provide a "task-request" that will result in displaying the object (GET_TASK_REQUEST_FOR_DISPLAY). For example, the object handler needs to check if the user is authorized to perform actions (CHECK_AUTHORIZATION). For example, the object handler checks whether the user is authorized to create new objects, to display objects and to delete objects.

Figure 3:
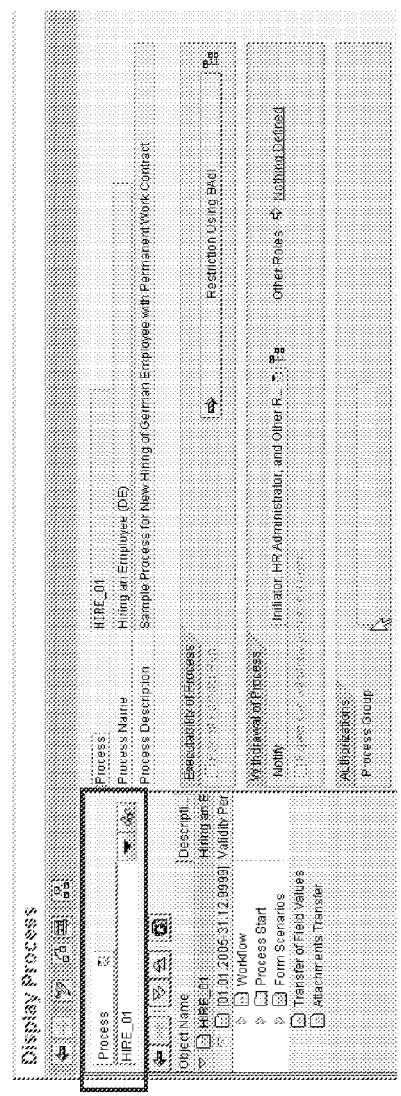
FIG. 3 shows an example of an object within the design time framework according to an example embodiment.

FIG. 3 shows a screenshot of the design time framework according to an embodiment of the present invention. The design time framework is shown displaying a process. The object of type "Process" having the ID HIRE_01 is shown. On the upper left part of the screenshot, an entry point for identifying and selecting processes is provided.

Figure 4:
FIG. 4 shows an example object area according to an example embodiment.

FIG. 4 shows this upper left part of the screenshot in greater detail, showing the example object area to handle types of objects.

Figure 5:
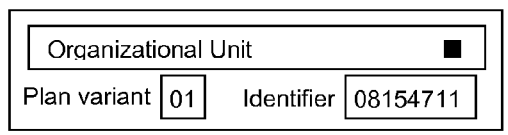
FIG. 5 shows an example object area for handling objects having multiple component keys according to an example embodiment.

FIG. 5 shows an example object area for handling objects with multiple or here, specifically, two-component keys. For example, the object of type "Organizational Unit" having a Plan Variant 01 and Identifier (ID) 08154711 is shown. Embodiments of the present invention support more than two-component keys as well, and may do so in a similar manner as shown for the two-component key example in FIG. 5.

In an embodiment of the present invention, the visualization or user interface in the design time framework comprises at least one of the following elements. For example, an element is a drop down list box for object type selection. The drop down list box includes all object types, e.g., represented by their descriptive text. The descriptive text is retrieved by calling method GET_INFO of the object handler. For example, an element is one input field if the ID of the object is a single component (e.g., as shown in FIG. 4). The input field needs to be typed correctly according to the type of the object ID. For example, the length of the input field is restricted to the length of the object ID. For example, this information, e.g., the number of components, type, length, is retrieved by calling method GET_INFO. For example, an element is if the ID of the object consists of more than one component, then there is an input field provided for each component of the ID. (FIG. 5 showed, for example, multiple components of an ID). For example, each input field has a label or descriptive text that describes the component. For example, all components are typed correctly and their length are restricted. For example, this information is retrieved by calling method GET_INFO. For example, an element is a button to show a list of existing objects. For example, when the user presses the button, the list of objects is retrieved by calling method GET_EXISTING_OBJECTS. For example, an element is a button to display the object that was entered in the input field. For example, this display occurs even if the displaying of the object is not within the scope of the object handler and/or the framework. For example, the design time calls method GET_TASK_REQUEST_FOR_DISPLAY. This method then returns a "task-request." The design time framework, for example, or other framework calls the object specific component that has registered on this task request. For example, an element is a button to delete the object that was entered in the input field. For example, a button could be displayed in FIG. 4. For example, when the user presses the button, method DELETE_OBJECT is called.

FIGS. 6, 7 and 8, show example embodiments describing user interaction and the calling methods of the object handler. In FIG. 6, a user action 602 is displayed in which a corresponding method call 604 occurs. In 606, the method call of creating a user interface based on information provided by method GET_INFO occurs. A user action 608 may involve selecting object type "Process" or other appropriate object type, and entering the appropriate identifier(s) such as "HIRE_01," and then presses the DISPLAY button. A method call 610 may involve calling method CHECK_OBJECT_EXISTS to check whether the object exists. If the object does exist, then TRUE or "1" or other indicator is returned. If the object does not exist, then FALSE or "0" or other indicator is returned. In this example, the object is found to exist. A method call 612 may involve calling method CHECK_AUTHORIZATION to check if the user or device is authorized to effect the action. If the user or device is authorized, the system may continue and/or communicate the authorization. If the user or device is not authorized, then the system may stop and/or communicate that the user or device was not authorized. A method call 614 may involve calling method GET_TASK_REQUEST_FOR_DISPLAY to call the object specific component that has registered on this task. Other method calls can take place here. The method calls discussed herein are for example purposes and not meant to limit the scope of the present invention.

A user action 616 may involve selecting the object type "Process" and enter identifier "HIRE_NEW." Upon pressing the DISPLAY button or other action effecting a similar result, certain method calls may occur. For example, a method call 618 calls method CHECK_OBJECT_EXISTS to check whether the object exists. An indicator may be given to the user or device concerning whether the object exists or not. In this example, the object is found to not exist. In such a situation, a user or device may be allowed a possibility to create the object. For example, method call 620 calls method CHECK_AUTHORIZATION to check whether the user or requesting device is authorized. If not authorized, then this information may or may not be communicated to the user. For example, if not authorized the user may be given a message that the "object does not exists and user does not have authorization to create the object." The user then may be prevented from proceeding further. Alternatively, the user or device may be found to be authorized or perhaps authorization was not checked. In such a situation, a popup interface 622 or other interface may be provided asking the user or device whether the user/device would like to create the object. Alternatively, the object may be created automatically. For example, a user action 624 may involve a user pressing the button "Yes, create object" in response to the interface provided. In response, for example, the method call 626 may involve calling the method CREATE_OBJECT. For example, the object handler creates the object. If the object handler wants to trigger any follow-up action, the object handler returns (in addition) a "task-request." The "task-request" may result in calling the object specific component that has registered on this task.

Continuing in accordance with the example of FIG. 6, in FIG. 7, an example user action 702 may include user action 706 then may involve the user entering "H*." The user then may press the button "SHOW_LIST" or effect this in an alternative way. In an example method call 704, the method call 708, the placeholder * may be detected in the input field. Method call 710 may involve calling method GET_EXISTING_OBJECTS by passing "H*" as importing parameter. For example, if the placeholder * was not used, then nothing would be passed as importing. And, the method would have to return a complete list of the existing object(s) in this case. Method call 712 then may involve listing the existing objects starting with the letter "H" in a popup or other display. At this time, for example, the user action 714 may involve the user or device selecting one of the objects in the listing resulting from method call 712. In method call 716, for example, the procedure may continue in the same way as if the user pressed the DISPLAY button for the selected object, in the same manner as discussed in the examples for FIGS. 6 and 7.

Continuing in accordance with the example of FIG. 6, in FIG. 8, an example user action 802 may involve the user entering something in an input field of a popup window or other interface 806. Further, the ENTER key may be pressed or an alternative method may be used to enter the input. An example method call 804 may involve checking 808 if the input done by the user contains any placeholders, for example, such as an "*" or "?" as defined/recognized by the system/framework. For example, if no placeholder is detected, then the process behaves in the same way as if the user pressed button DISPLAY or alternative event having the same result. For example, if a placeholder is found, then the process behaves in the same way as if the user pressed button SHOW_LIST or alternative event having the same result. A user action 810 may occur in which the user selected the object type and enters the identifier(s) associated with the object type, and presses the DELETE button. In this situation, for example, the method CHECK_OBJECT_EXISTS is called to check if the object exists 812. If the object does not exist, then the user or device may be notified and also may be stopped from proceeding further. For example, the method CHECK_AUTHORIZATION is called to check if the user or device is authorized to delete the object 814. If the user or device is not authorized, then a communication may be made to that effect. And, the user or device may be prevented from proceeding further. If the user or device is authorized, then a communication may be made to that effect. For example, a popup may be showed in which the user or device is asked whether the object should be deleted 816. If the user or device chooses to delete the object, then the method DELETE_OBJECT or the like is called to delete the object 818.

It should be understood that there exist implementations of other variations and modifications of the invention and its various aspects, as may be readily apparent to those of ordinary skill in the art, and that the invention is not limited by specific embodiments described herein. Features and embodiments described above may be combined with and without each other. It is therefore contemplated to cover any and all modifications, variations, combinations or equivalents that fall within the scope of the basic underlying principals disclosed and claimed herein.

What is claimed is:

1. A method for handling objects in a software framework, comprising:
   providing an object handler for a specific object type;
   providing a first user interface by the software framework, the first user interface having at least one input field for entry of an identifier of an object;
   entering the identifier of the object in the at least one input field;
   responsive to receiving the entered identifier, effecting a calling method to the object handler to check whether the object associated with the entered identifier exists;
   checking by the object handler to determine whether the object associated with the entered identifier exists using a lookup table listing of objects and their respective identifiers;
   communicating to the object handler a response indicating whether the object exists;
   determining by the object handler if an additional property associated with the object needs to be maintained; and
   if so,
      presenting a second user interface for entering the additional property;
      determining if the second user interface is within the software framework; and
      if the second user interface is not within the software framework, returning a task request by the object handler to the software framework, wherein the task request includes an object key of the object and an additional task to be performed by the software framework,
   wherein the object handler handles the specific object type, and each respective object associated with the specific object type is represented by an identifier having a character string of a certain length.

2. The method of claim 1, wherein the task request is one of information, an associated object key, another component, and an identifier representing a task to be performed for the object.

3. The method of claim 1, wherein the object handler maintains information concerning at least one of the number of components of an object key associated with a respective object, a type of each component of the object key, a length of each component of the object key, and a descriptive text for each component of the object key.

4. The method of claim 3, wherein an object key requires at least two components including a plan variant, and an identifier.

5. The method of claim 1, wherein the first user interface includes a drop down list box for object type selection represented by a respective descriptive text, the descriptive text having been retrieved by a calling method of the object handler.

6. A non-transitory computer-readable medium including instructions adapted to execute a method for providing handling of different types of objects, the method comprising:
   creating a first user interface based on information provided by a method call of an object handler;
   selecting an object type and entering at least one associated identifier via the first user interface;
   effecting a method call of the object handler to check whether the object associated with the selected object type and the entered at least one associated identifier exists;
   depending upon the check by the object handler, effecting an action;
   determining if an additional property associated with the object needs to be maintained,
   if so,
      presenting a second user interface for entering the additional property;
      determining if the second user interface is within the software framework; and
      if the second user interface is not within the software framework, returning a task request by the object handler to the software framework, wherein the task request includes an additional task to be performed by the software framework.

7. A system for handling objects in a software framework, comprising:
   a processor configured to perform:
   providing an object handler for a specific object type;
   providing a first user interface by the software framework, the first user interface having at least one input field for entry of an identifier of an object;
   entering the identifier of the object in the at least one input field;
   responsive to receiving the entered identifier, effecting a calling method to the object handler to check whether the object associated with the entered identifier exists;
   checking by the object handler to determine whether the object associated with the entered identifier exists using a lookup table listing of objects and their respective identifiers;
   communicating to the object handler a response indicating whether the object exists;
   if an additional property associated with the object needs to be maintained,
      presenting a second user interface for entering the additional property;

determining if the second user interface is within the software framework; and if the second user interface is not within the software framework, returning a task request by the object handler to the software framework, the task request includes an additional task to be performed by the software framework, wherein the object handler handles the specific object type, and each respective object associated with the specific object type is represented by an identifier having a character string of a certain length.

* * * * *